United States Patent
Serizawa et al.

(10) Patent No.: US 6,406,173 B1
(45) Date of Patent: Jun. 18, 2002

(54) VEHICLE LAMP HAVING LIGHT-EMITTING ELEMENTS WITH CONNECTING STRUCTURE

(75) Inventors: Tomoaki Serizawa; Tsutomu Machida, both of Shizuoka (JP)

(73) Assignee: Koito Manufacturing Company, Ltd. (JP)

( * ) Notice: Subject to any disclaimer, the term of this patent is extended or adjusted under 35 U.S.C. 154(b) by 0 days.

(21) Appl. No.: 09/507,143

(22) Filed: Feb. 18, 2000

(51) Int. Cl.[7] ............................................. F21V 21/00
(52) U.S. Cl. ....................... 362/545; 362/368; 362/548; 362/549; 362/543; 362/238
(58) Field of Search ................. 362/800, 459, 362/487, 543–545, 549, 548, 227, 235, 238, 249, 226; 439/121, 122, 251, 246, 395, 435, 443, 888

(56) References Cited

U.S. PATENT DOCUMENTS

| | | | |
|---|---|---|---|
| 4,315,663 A | 2/1982 | Olsson | 339/97 P |
| 4,707,767 A * | 11/1987 | Berginet al. | 362/544 |
| 5,025,350 A * | 6/1991 | Tienken | 362/544 |
| 5,436,809 A * | 7/1995 | Brassier et al. | 362/545 |
| 5,490,049 A * | 2/1996 | Montalan et al. | 362/240 |
| 5,663,907 A | 9/1997 | Frayer et al. | 365/185.18 |
| 5,732,021 A | 3/1998 | Smayling et al. | 365/185.29 |
| 5,746,497 A | 5/1998 | Machida | |
| 5,823,816 A * | 10/1998 | Uchida et al. | 439/419 |
| 5,975,715 A * | 11/1999 | Bauder | 362/226 |

FOREIGN PATENT DOCUMENTS

| | | | | |
|---|---|---|---|---|
| EP | 0757356 A1 | 2/1997 | | G11C/16/06 |
| FR | 2707222 | * | 1/1995 | B60Q/1/26 |
| GB | 2334152 A | 5/1998 | | |

* cited by examiner

Primary Examiner—Sandra O'Shea
Assistant Examiner—Ismael Negron
(74) Attorney, Agent, or Firm—Fish & Richardson P.C.

(57) ABSTRACT

A vehicle lamp comprising a lamp body and a light source unit. The lamp body defines a lamp chamber in cooperation with a lens mounted to a front opening of the lamp body. The light source unit in the lamp chamber includes a plurality of light-emitting elements, a base supporting the light-emitting elements, and at least one electric cord. Holders for the light-emitting elements of the light source unit are fit to the base of the light source unit, and the light-emitting elements are electrically connected to the electric cord by holding the electric cord between one of the holders and one of the light-emitting elements.

12 Claims, 8 Drawing Sheets

VEHICLE LAMP HAVING LIGHT-EMITTING ELEMENTS WITH CONNECTING STRUCTURE

BACKGROUND OF THE INVENTION

1. Field of the Invention

This invention relates to a vehicle lamp which uses light-emitting elements, such as a LED (light-emitting diode), as a light source, and more particularly to a vehicle lamp in which lead terminals of the light-emitting elements are electrically connected directly to electric cords.

2. Description of the Related Art

A lamp using light-emitting elements, such as a LED (light-emitting diode), as a light source has been used as a signal lamp of an automobile and particularly as a rear lamp such as a tail and stop lamp and a turn signal lamp. In such a lamp, a plurality of light-emitting elements are mounted on a circuit board, and the light-emitting elements are electrically connected by a circuit pattern formed on the circuit board so that the light-emitting elements can be energized to emit light. In the case where a front surface of such a lamp is required to be formed into a quadratic-curve surface or a cubic-curve surface, for example, at a corner portion of a body of an automobile, the circuit board having the light-emitting elements mounted thereon is also required to be formed into a quadratic-curve surface or a cubic-curve surface conforming to the curved front surface of the lamp. In the case of the quadratic-curve surface, this can be dealt with by curving the circuit board. However, in the case of the cubic-curve surface, it is necessary to divide the circuit board into a plurality of sections and to arrange these sections in a three-dimensional manner, and as a result the construction of the circuit board becomes complicated, so that the cost becomes high. Therefore, there has been proposed lamp such that any circuit board is not used, and instead there are provided boards each having a holder for holding a light-emitting element integrally formed thereon. Electric cords are provided and extended from the holder, and when the light-emitting element is fitted into the holder to be retained therein, sheaths of the electric cords are cut by leads of the light-emitting element, so that the leads of the light-emitting element are electrically connected to conductors of the electric cords. With this electrical connection structure, the plurality of circuit boards are not necessary, and therefore even when the lamp having a cubic-curve surface is prepared using a plurality of boards, the cost can be reduced.

However, in the lamp in which the light-emitting elements are arranged in a three-dimensional manner with a plurality of boards as described above, it is necessary to incorporate the boards into the lamp with adjusting the optical axes of the light-emitting elements mounted on the respective boards, when the plurality of boards are combined together. Therefore, the operation becomes cumbersome. Moreover, the holder for the light-emitting element is formed integrally with the board, and therefore when the light-emitting element is to be electrically connected directly to the electric cords, it is necessary first to provide and extend the electric cords over the holder and then to fit the light-emitting element into the holder. Therefore, there is encountered a problem that the degree of freedom of the assembling operation is limited, so that the efficiency of the assembling operation is low. Furthermore, the lead of the light-emitting element is formed by one metal piece, and when the light-emitting element is fitted into the holder to be retained therein, the light-emitting element tends to be tilted relative to the holder, and the posture of the light-emitting element is unstable, so that it is difficult to hold the light-emitting element in a desired optical axis direction, and besides the contact of the light-emitting element with the electric cords is liable to be unstable.

SUMMARY OF THE INVENTION

Accordingly, an object of this invention is to provide a vehicle lamp which has light-emitting elements arranged in a three-dimensional manner, and can be assembled easily and highly efficiently.

According to the present invention, there is provided a vehicle lamp comprising a lamp body and a light source unit. The lamp body defines a lamp chamber in cooperation with a lens mounted to a front opening of the lamp body. The light source unit in the lamp chamber includes a plurality of light-emitting elements, a base supporting the light-emitting elements, and at least one electric cord. Holders for the light-emitting elements of the light source unit are fit to the base of the light source unit, and the light-emitting elements are electrically connected to the electric cord by holding the electric cord between one of the holders and one of the light-emitting elements.

Moreover, it is also preferable that a vehicle lamp in which a lamp body and a lens mounted on an open front side of the lamp body jointly forms a lamp chamber, and a light source unit is housed in the lamp chamber, and the light source unit comprises a plurality of light-emitting elements, a base having the light-emitting elements mounted thereon in an arrayed condition, and electric cords electrically connected to the light-emitting elements. In the vehicle lamp, a plurality of steps are formed on the base in a stair-like manner; and holders that respectively hold the light-emitting elements are supported respectively on the plurality of steps by fitting connection; and the electric cords are held between each of the holders and the associated light-emitting element, and are electrically connected to the light-emitting element. The light-emitting element has lead terminals each of which is folded back at a region disposed generally centrally of a length thereof in a direction of a thickness, and a distal end portion and a proximal end portion of the lead terminal are fitted in the holder, and are electrically connected to the electric cord. A reflector for reflecting light emitted from the light-emitting elements is provided between the base and the lens, and the reflector is made of the same material as that of the base.

The base is formed into a stair-like configuration, and the electric cords and the light-emitting elements are mounted on the base using the holders attached respectively to the steps, and with this construction the lamp having a cubic-curve surface and the light-emitting elements mounted therein in a three-dimensional manner can be easily achieved at a low cost.

DETAILED DESCRIPTION OF THE PREFERRED EMBODIMENT

Figure 1:
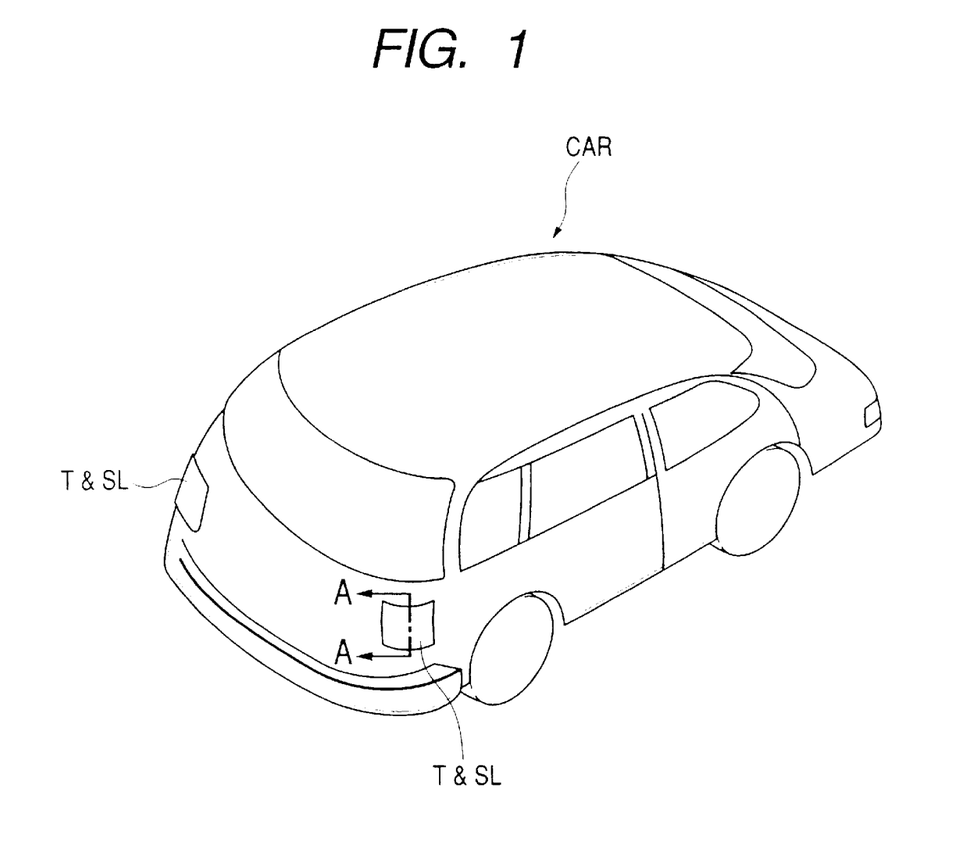
FIG. 1 is a perspective view showing a preferred embodiment of a lamp of the present invention.
Figure 2:
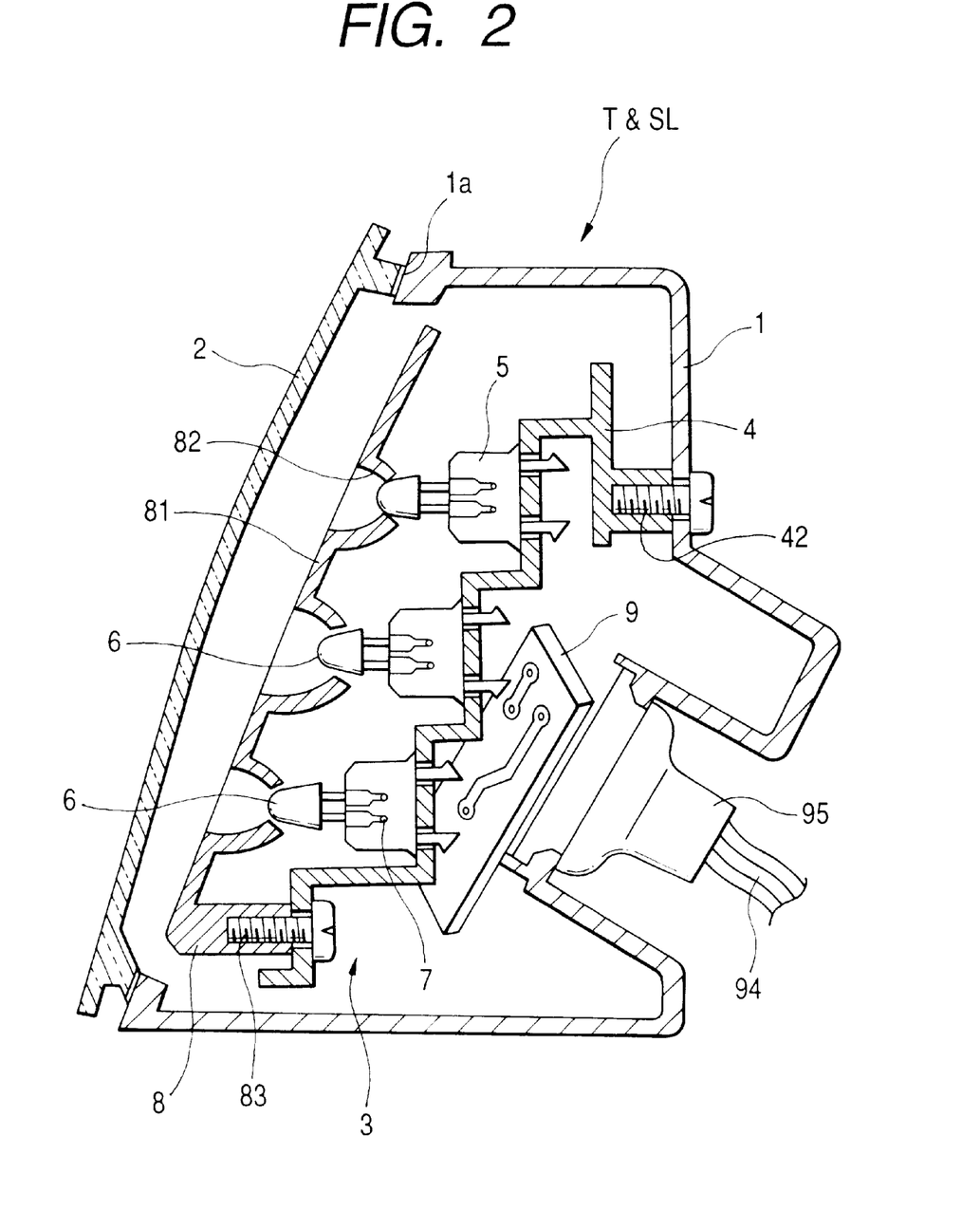
FIG. 2 is an enlarged cross-sectional view taken along the line A—A of FIG. 1.
Figure 3:
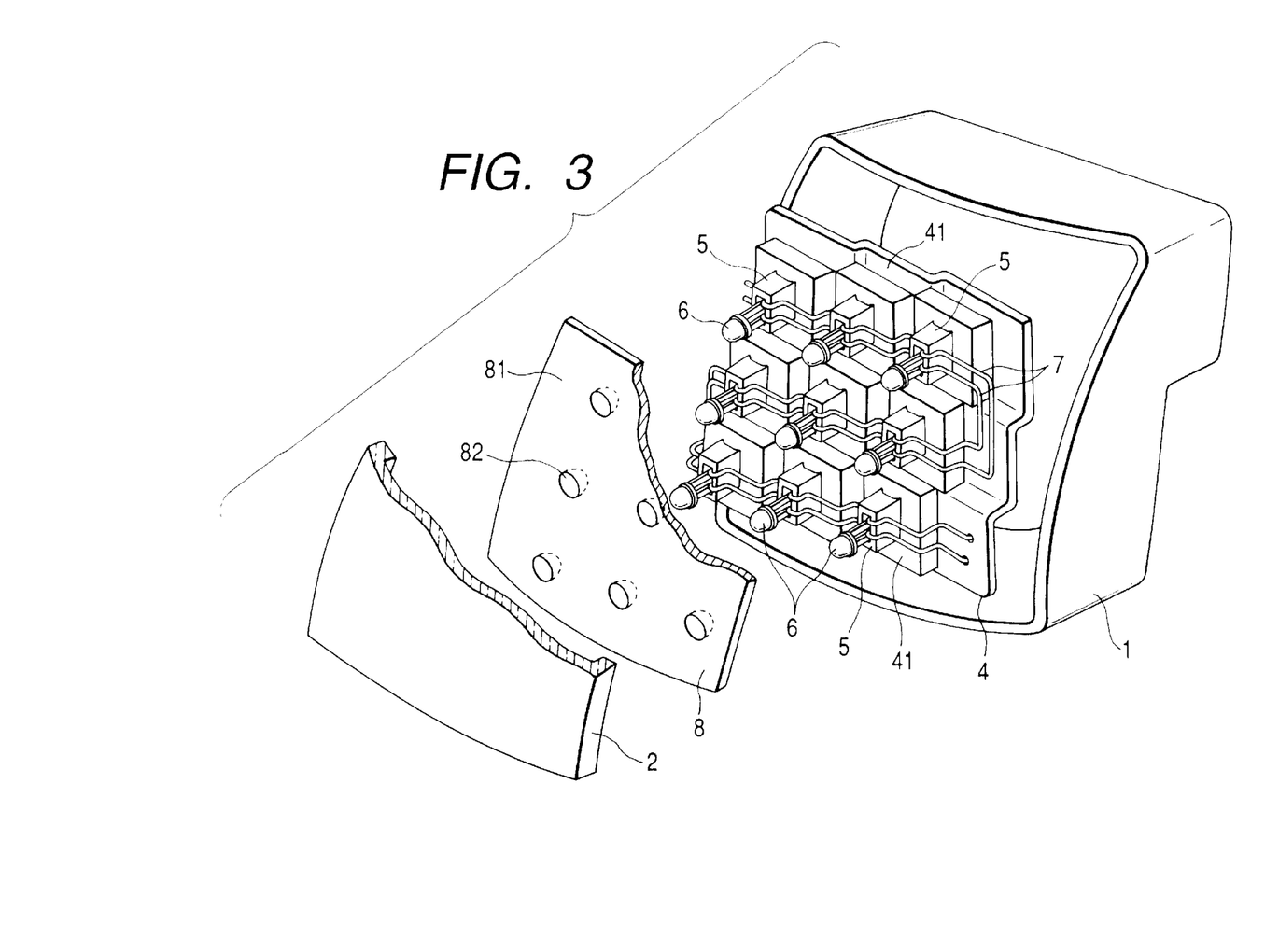
FIG. 3 is a partly-broken and exploded perspective view of the lamp of FIG. 2.

A preferred embodiment of the present invention will now be described with reference to the drawings. Here, a lamp embodying the present invention is a tail and stop lamp of an automobile. FIG. 1 is a perspective view showing the lamp, FIG. 2 is an enlarged cross-sectional view taken along the line A—A of FIG. 1, and FIG. 3 is a partly-broken exploded perspective view of the lamp. As shown in FIG. 1, the tail and stop lamp T & SL, provided at each of right and left rear corners of an automobile CAR, has a front surface which is slanting or curved in horizontal and vertical directions, and conforms to a cubic-curve surface of the automobile CAR. A lamp body 1 of the tail and stop lamp T & SL is made of a resin, and has an open front side as shown in FIGS. 2 and 3. A peripheral edge 1a of this front opening is formed into a three-dimensional shape conforming to the cubic-curve surface of a car body of the automobile CAR. A lens 2 of a cubic-curve shape is mounted on the open front side of the lamp body 1, and this lens 2 has a curved surface which is gently curved three-dimensionally in conformity with the three-dimensional shape of the peripheral edge 1a of the front opening in the lamp body 1. A lamp chamber is defined by the lamp body 1 and the lens 2. The lens 2 is fixedly secured at its peripheral edge portion to the peripheral edge 1a of the front opening of the lamp body 1 by hot plate welding or the like. A light source unit 3 comprises a base 4, holders 5, light-emitting elements 6 (for example, LED) and electric cords 7, and a reflector 8, and are supported within the lamp chamber.

The base 4 has a plurality of steps 41 arranged three-dimensionally in a stair-like manner, and these steps 41 are arranged or arrayed generally in conformity with the cubic-curve surface of the lens 2, and are fixed to the lamp body 1. The holders 5, more fully described later, are fittingly mounted on the steps 41, respectively, and the light-emitting elements 6 are held on the holders 5, respectively, and the electric cords 7 respectively having insulating sheaths are extended over the holders 5. The light-emitting elements 6 are energized through the electric cords 7. A control circuit board 9 forming an electrical circuit for causing the light-emitting elements 6 to emit light is mounted on a reverse side of the base 4. As will be more fully described later, this control circuit board 9 is electrically connected to the electric cords 7, and is also connected to a power cord 94 and a connector 93 through which the control circuit board 9 is connected to a battery (not shown) The reflector 8 is provided at the front side of the base 4 and serves to reflect light emitted from the light-emitting elements 6 in a direction away from the rear of the automobile. The reflector 8 is fixed to the base 4.

Figure 4:
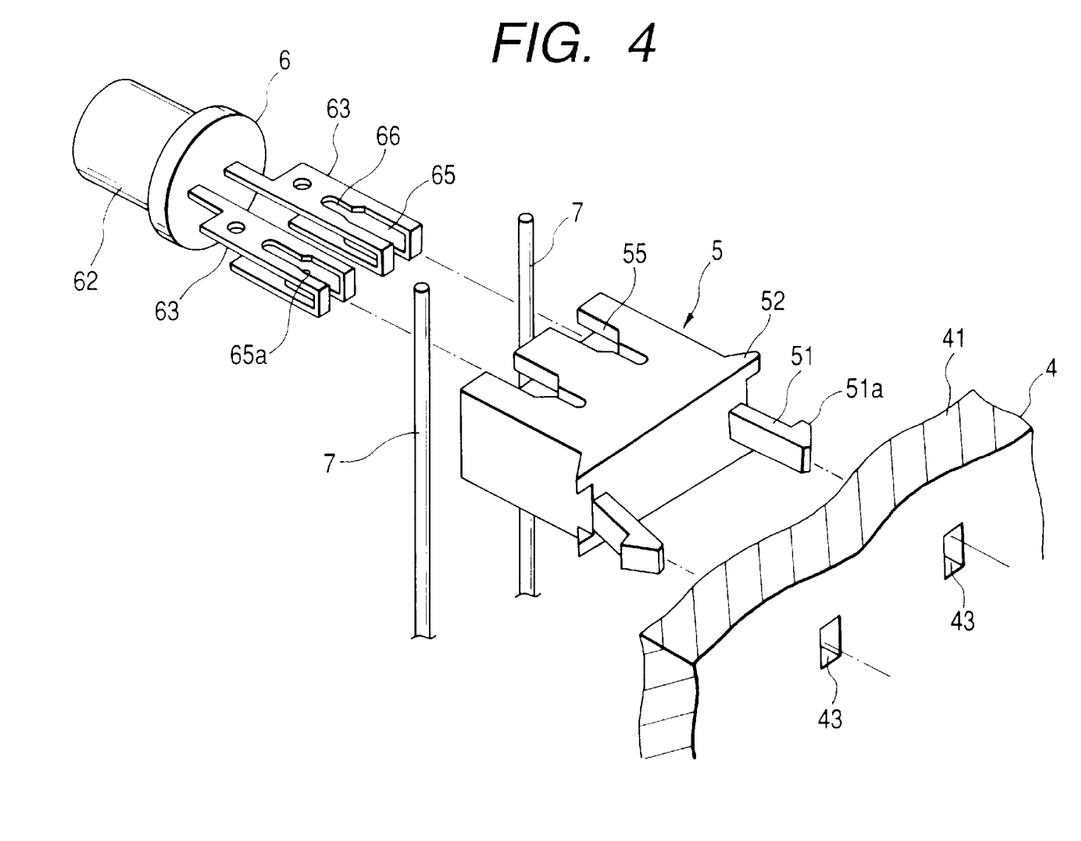
FIG. 4 is an enlarged and exploded perspective view of a portion of the lamp of FIG. 3.

Details of the light source unit 3 comprising the base 4, the holders 5, the light-emitting elements 6 and the electric cords 7 will be described with reference to FIG. 4 which is an enlarged, exploded view of a portion of the lamp of FIG. 3. The base 4 is molded with a resin, and the steps 41 are arranged in a stair-like manner in upward-downward and right-left directions of the automobile. The steps 41 are molded with a resin, and are formed integrally with one another, and jointly form a cubic-curve surface substantially parallel to the lens 2. Each of the steps 41 has a sufficient area to enable the holder 5 to be mounted thereon, and has a pair of juxtaposed small fitting holes 43 spaced a predetermined distance from each other. The base 4 has a plurality of bosses, formed on an outer peripheral portion thereof, and is fixedly secured to the lamp body 1 by screws 42 threaded respectively into these bosses.

Figure 5A:
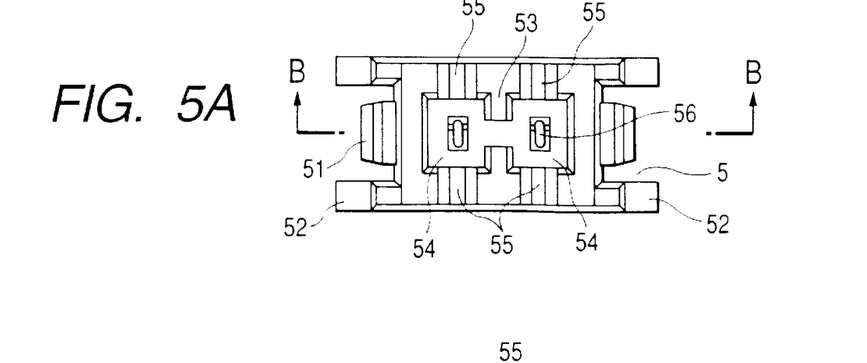
FIGS. 5A to 5C are a plan view of a holder, a front-elevational view thereof, and a cross-sectional view taken along the line B—B, respectively.
Figure 5B:
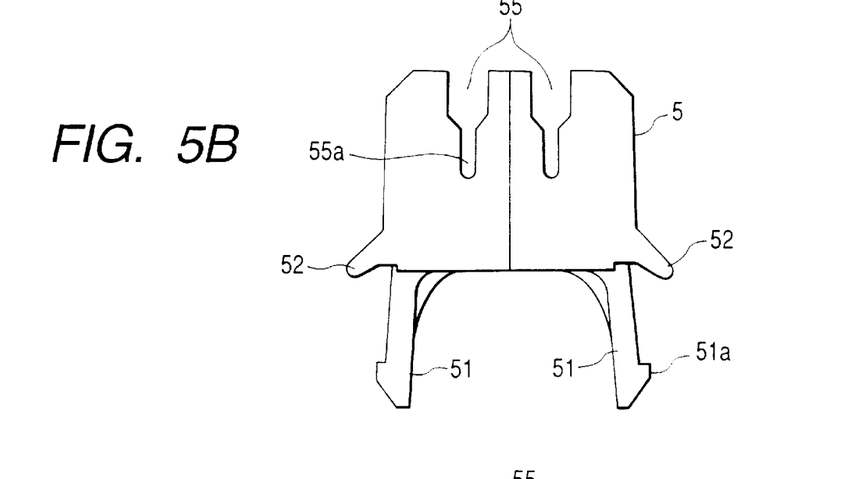
Figure 5C:
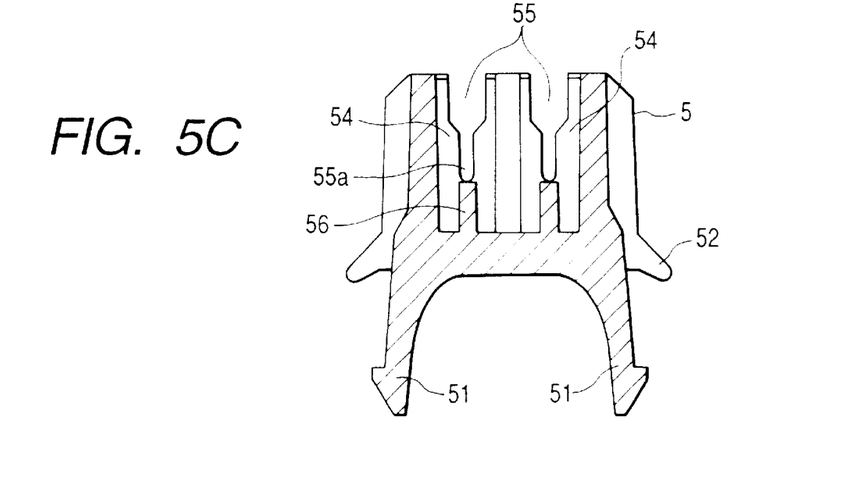

As shown in FIGS. 5A, 5B and 5C which are a plan view, a front-elevational view and a cross-sectional view taken along the line B—B, respectively, the holder 5 has a small rectangular container-like shape with an open front side, and two fitting legs 51 each having a lance 51a at its distal end are projected respectively from opposite side portions of a rear surface of the holder S. The holder 5 is fixedly secured to the base 4 by fitting the fitting legs 51 respectively into the small fitting holes 43 formed in the step 41 of the base 4. Support piece portions 52 are formed on and projected respectively from the four corners of the holder 5 at the rear end thereof, and when the holder 5 is fixed to the base 4, these support piece portions 52 serve to hold the holder 5 in a posture perpendicular to the surface of the base 4. A projection 53 is formed on an inner surface of each of opposite side walls of the holder 5, and is disposed centrally of the length of the opposite side wall. The front opening of the holder 5 is divided by these projections 53 into two lead insertion holes 54 juxtaposed to each other in the longitudinal direction. Cord passage grooves 55 are formed respectively through each of the opposite side walls of the holder 5 corresponding with the two lead insertion holes 54, respectively, each of the cord passage grooves 55 extending from the front side of the holder 5 toward the rear side thereof. The cord passage groove 55 is wide at its open end portion, but is narrow at its inner end portion 55a, and the width of the inner end portion 55a is substantially equal to the diameter of the electric cord 7. A guide piece portion 56 for fitting in a distal end portion of a lead (described later) of the light-emitting element 6 is formed on and projected perpendicularly from a bottom surface of each lead insertion hole 54.

Figure 6A:
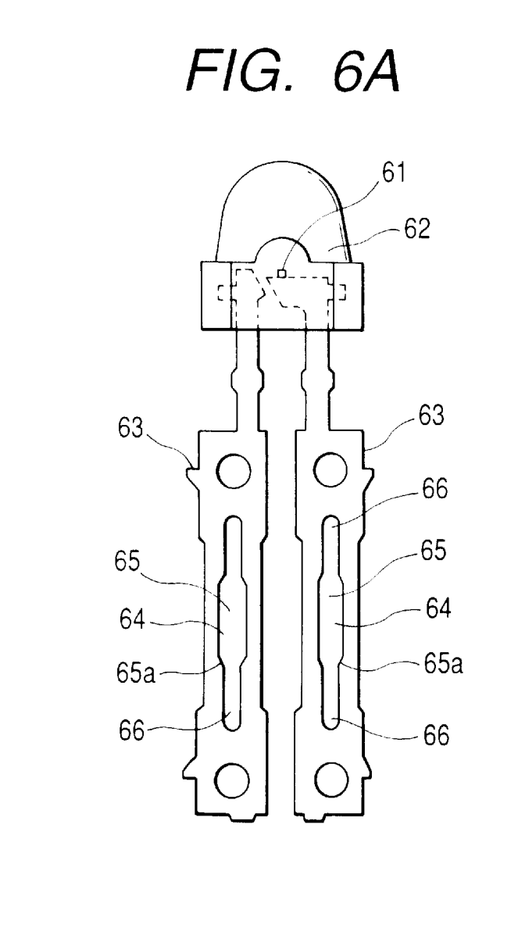
FIGS. 6A to 6C are front-elevational views and a side-elevational view of a light-emitting element showing conditions before and after leads of the light-emitting element are processed.
Figure 6B:
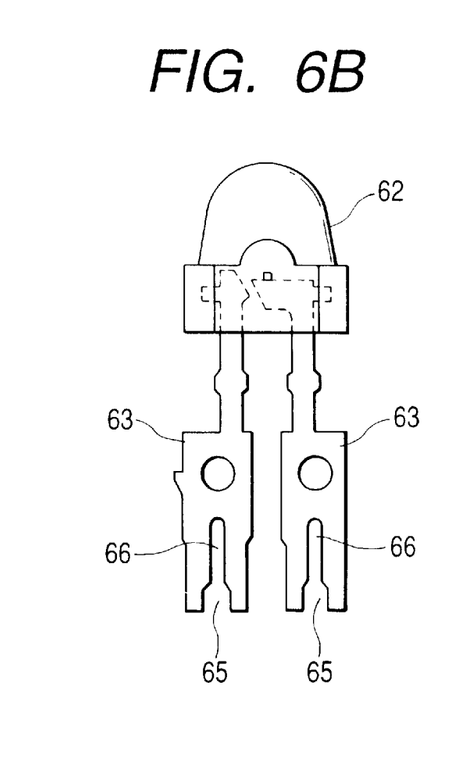
Figure 6C:
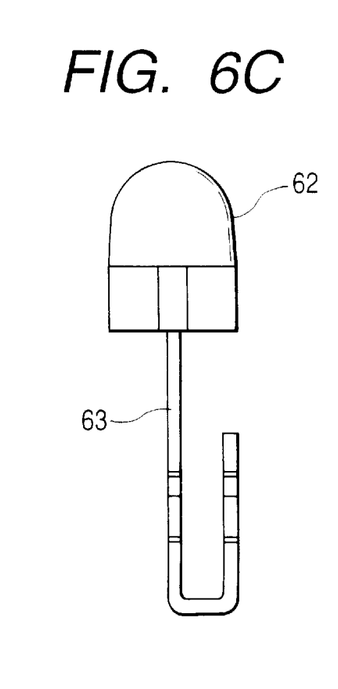

The light-emitting element 6 is a discrete-type light-emitting element, and includes a light-emitting element chip 61 sealed in a resin package 62, and a pair of parallel lead terminals 63 which are electrically connected to the light-emitting element chip 61 and projected outwardly from the resin package 62. As shown in FIGS. 6A to 6C, for forming the lead terminals 63, a lead frame is formed from a metal sheet by pressing or etching, and then this lead frame is cut into predetermined pieces, and this metal sheet piece is bent to thereby form the lead terminal 63. Before the bending operation, each lead terminal is in the form of a strip having a slit 64 in a central portion thereof, as shown in FIG. 6A. The width of the lead terminal 63 is slightly smaller than the width of the lead insertion hole 54 in the holder 5. The slit 64 has a central portion (in the longitudinal direction) defining a wide slit portion 65 and opposite end portions defining narrow slit portions 66, respectively. The wide slit portion 65 has a generally elongate-oval shape, and opposite ends 65a of the wide slit portion 65 disposed immediately adjacent to the narrow slit portions 66, respectively, have an arcuate shape. The width of the wide slit portion 65 is slightly larger than the diameter of the electric cord 7, and the width of the narrow slit portion 66 is substantially equal to a diameter of a conductor covered with an insulating sheath of the electric cord 7. As shown in FIG. 6B, the above lead terminal 63 is folded back at a region disposed generally centrally of the length thereof, that is, folded back at a central portion of the wide slit portion 65 in the direction of the sheet thickness thereof, thereby providing a generally U-shape. As a result, the lead terminal 63 is formed into a two-blade lead which has a bifurcated distal end portion (whose extremity is defined by that portion of the lead terminal 63 at which the middle point of the wide slit portion 65 lies), and has a width equal to the width of the lead insertion hole 54 in the holder 5 as a result of folding of the lead terminal 63, as shown in FIG. 6C which shows the shape of the side of this lead.

Figure 7:
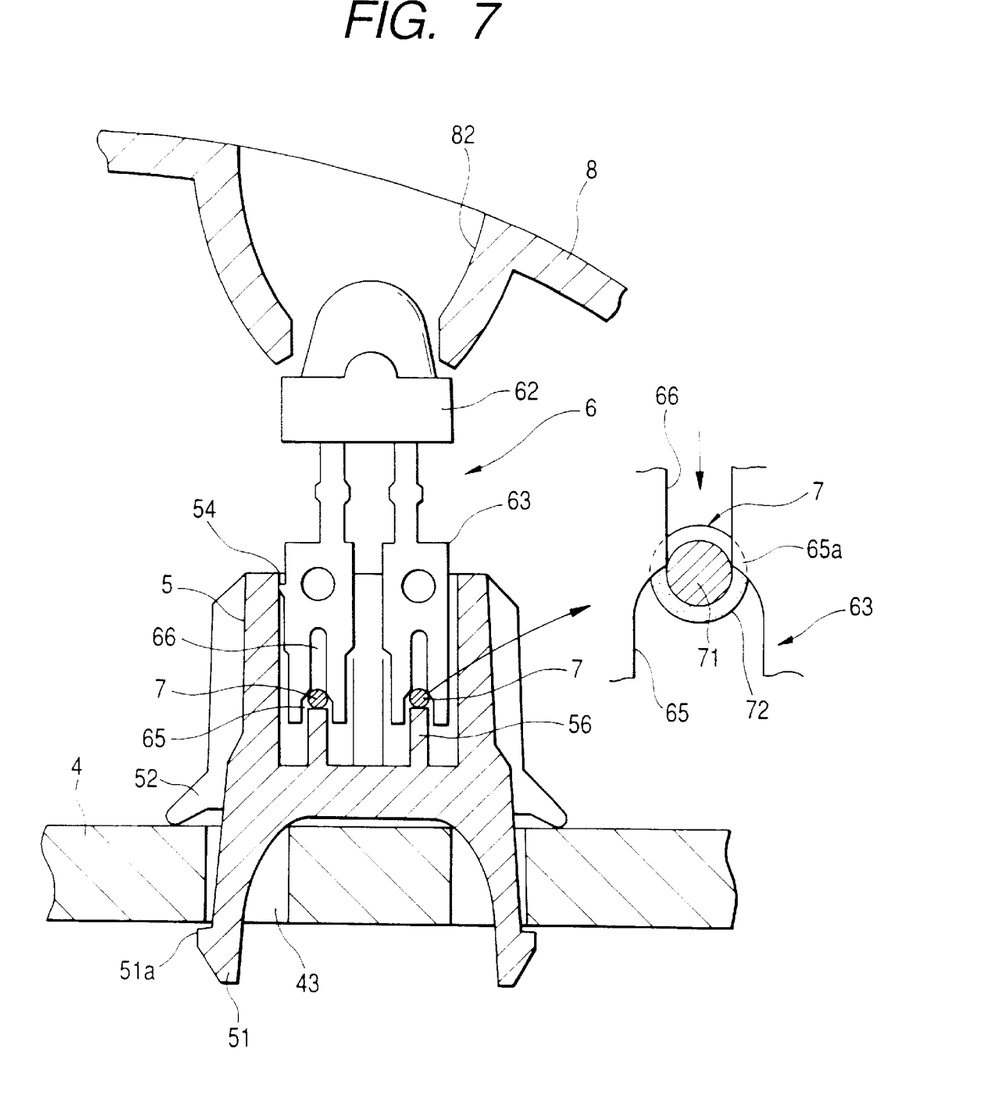
FIG. 7 is an enlarged cross-sectional view of a portion of FIG. 2.

For assembling the light source unit 3 using the base 4, the holders 5, the light-emitting elements 6 and the electric cords 7, the holders 5 are first mounted respectively on the steps 41 of the base 4 (see FIG. 7 which is a cross-sectional view showing the assembled condition of this unit). When the holder 5 is thus to be mounted, the fitting legs 51 of the holder 5 are inserted respectively into the small fitting holes 43 in the step 41, so that the lance 51*a* at the distal end of each fitting leg 51 is engaged with the peripheral edge portion of the associated small fitting hole 43 at the reverse surface of the base 4, thereby fixedly securing the holder 5 to the step 41. Then, the two electric cords 7 are extended over the plurality of holders 5, mounted respectively on the steps 41, in parallel relation to each other. As shown in FIG. 7 on an enlarged scale, each electric cord 7 is an insulated and covered electric cord including the conductor 71 covered with an insulating material. The electric cords 7 are fitted into the cord passage grooves 55 provided in the pair of lead insertion holes 54 in the holder 5. Then, the pair of lead terminals 63 of the light-emitting element 6 are inserted respectively into the lead insertion holes 54, and are engaged with the electric cords 7, respectively. When the lead terminal 63 is thus inserted, the wide slit portion 65 is first brought into engagement with the insulating sheath 72, and then the narrow slit portions 66 are brought into engagement with the insulating sheath 72 to cut the same. The ends 65*a* of the wide slit portion 65, disposed immediately adjacent to the narrow slit portions 66, have a generally right-angled edge shape, and therefore the effect of cutting the insulated sheath 72 is enhanced. When the narrow slit portions 66 are inserted to grip the electric cord 7, the narrow slit portions 66 are held in direct contact with the conductor 71 of the electric cord 7, so that the lead terminal 63 is electrically connected to the electric cord 7. As described above, the lead terminal 63 has a two-blade configuration as a result of the folding operation, and therefore the opposed walls of the lead terminal 63 are held in contact with the inner surfaces of the lead insertion hole 54, respectively, and as a result the light-emitting element 6 is hardly tilted. Besides, each of the opposed walls of the lead terminal 63 is electrically connected to the electric cord 7 at two portions thereof, and therefore the positive connection can be achieved, and this is also advantageous in that a contact resistance between the two is reduced.

Figure 8:
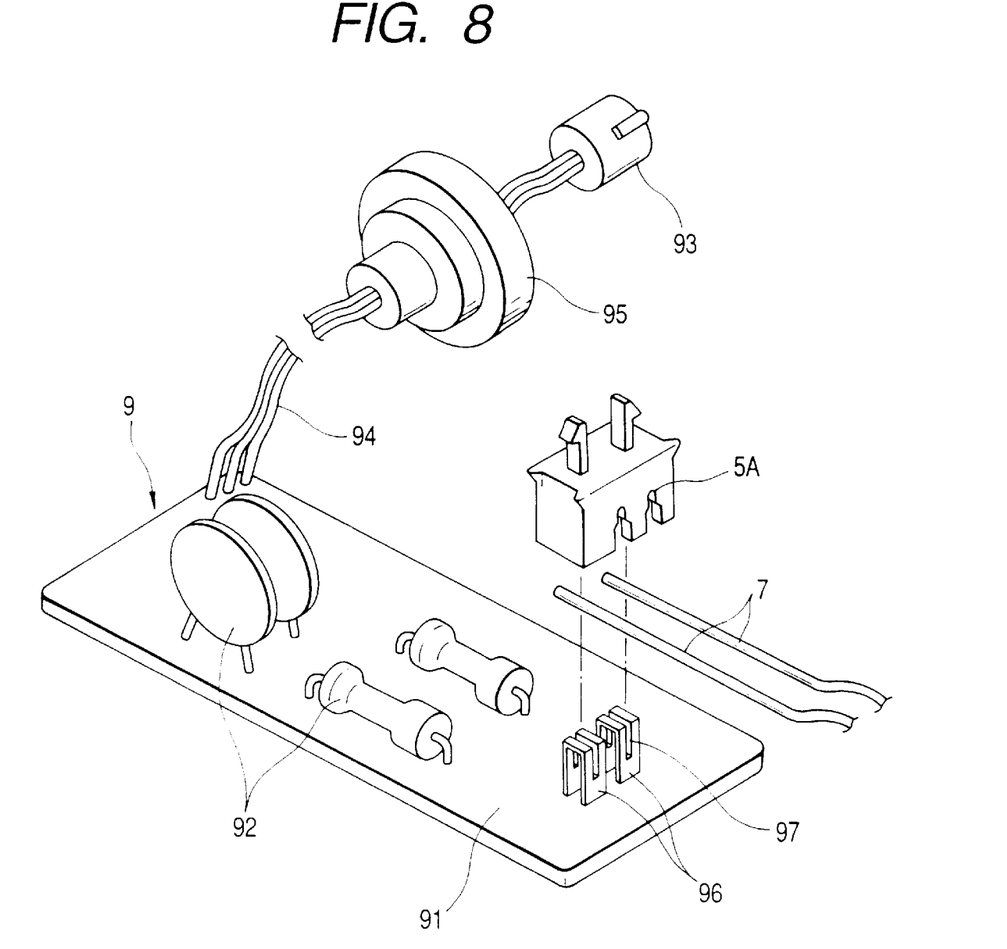
FIG. 8 is a perspective view showing a control circuit board.

The electric cords 7 are electrically connected at their one ends to the control circuit board 9 mounted on the rear surface of the base 4 (see FIG. 2). As shown in FIG. 8, various electronic parts 92 are mounted on a printed circuit board 91 of this control circuit board 9, and the power cord 94 connected to the connector 93 connected to a connector of the battery (not shown) is connected to the printed circuit board 91. A rubber bushing 95 attached to the lamp body 1 in a waterproof manner is fitted on the intermediate portion of the power cord 93. A pair of electrode terminals 96 for electrically connecting the printed circuit board 91 to the electric cords 7 are formed upright on the printed circuit board 91, and these electrode terminals 96 have a configuration similar to that of the lead terminals 63 of the light-emitting element 6. Namely, the electrode terminal 96 is formed by bending a lead terminal similar to the lead terminal 63 of the light-emitting element 6, and both ends of the thus bent lead terminal are secured by soldering to the printed circuit board 91. Therefore, the electrode terminal 96 has a slit 97 (extending from a distal end thereof toward a proximal end thereof) similar to the slit 64 of the lead terminal 63 having the wide slit portion 65 and the narrow slit portions 66. For connecting the electric cords 7 to the electrode terminals 96, a holder 5A identical to the holder 5 is used. More specifically, the electric cords 7 are fitted in cord passage grooves in the holder 5A, and then the holder 5A is turned over, and is fitted on the electrode terminals 96 to cover the same. As a result, the electric cords 7 connected to the holder 5A are forced respectively into the slits 97 of the electrode terminals 96, so that the insulating sheaths of the electric cords 7 are cut as described above for the light-emitting element 6, and the electric cords 7 are electrically connected to the electrode terminals 96, respectively. Therefore, the lead terminal 63 of the light-emitting element 6 and the holder 5 can be used also as the electrode terminal 96 and the holder 5A, respectively, and advantageously the number of kinds of the component parts can be reduced, and the cost can be reduced.

The thus assembled light source unit 3 is mounted within the lamp body 1, with the base 4 fixedly secured to the lamp body 1 by the screws 42. At this time, the reflector 8 is mounted on the light source unit 3. Referring to FIGS. 2 and 3, the reflector 8 includes an extension portion 81, having a cubic-curve shape similar to that of the lens 2, and a plurality of reflector portions 82 of a paraboloidal shape formed respectively in those portions of the extension portion 81 which are opposed respectively to the light-emitting elements 6 mounted on the base 4, each of the reflector portions 82 being recessed in a direction away from the front surface of the reflector 8. The reflector 8 is integrally molded of the same resin as that of the base 4, and a thin film of aluminum or the like is formed on the front surface of the reflector 8, and serves as a reflecting surface. A rear end of each reflector portion 81 is open, and the resin package 62 of the associated light-emitting element 6 is received in this open rear end. A plurality of bosses are formed on the rear surface of the reflector 8, and the reflector 8 is fixedly secured to the base 4 by screws 83 threaded respectively into these bosses.

In the lamp of this construction, electric power is supplied to the control circuit board 9 from the power cord 94 connected to the battery (not shown), and is further supplied to the pair of electric cords 7 through the electrode terminals 96 to which these electric cords 7 are electrically connected by the holder 5A. These electric cords 7 are extended over the plurality of steps 41 formed on the base 4, and the electric cords 7 are held between the holder 5 and the light-emitting element 6 at each step 41, and are electrically connected respectively to the pair of lead terminals 63 of the light-emitting element 6, so that each light-emitting element 6 can emit light. The light emitted from each light-emitting element 6 is condensed by the associated reflector portion 82 of the reflector 8, and is radiated forwardly of the lamp through the lens 2.

As described above, the base 4 is formed into a stair-like configuration to provide the plurality of steps 41 arranged in a three-dimensional manner, and the light-emitting elements 6 are mounted respectively on the steps 41 to provide a three-dimensional arrangement. Therefore, unlike the conventional construction, it is not necessary to combine a plurality of boards into a three-dimensional arrangement, and therefore the number of the component parts is reduced, and the cost is reduced, and besides the assembling operation is simplified. In this case, the holders 5 for respectively holding the light-emitting elements 6 are not formed integrally with the base 4, and therefore a mold for forming the base 4 is not complicated, and the cost can be further reduced.

For assembling the light source unit 3, the holders 5 are mounted on the base 4 by the fitting connection, and the electric cords 7 are fitted in the cord passage grooves 55 in the holder 5, and then the lead terminals 63 of the light-emitting element 6 are inserted respectively into the lead insertion holes 54 in the holder 5. By thus fitting the lead terminals 63 into the respective lead insertion holes 54, the holding of the light-emitting element 6 and the electrical connection of the light-emitting element 6 to the electric cords 7 can be effected at the same time, and therefore the assembling operation is quite easy. In this case, there can be used a method in which the electric cords 7 and the light-emitting elements 6 is first held on each holder 5, and then the holder 5 is mounted on the base 4. Thus, the degree of freedom of the assembling operation is enhanced. The insulating sheath 72 of the electric cord 7 is suitably cut by the edge portions 65a each formed at the boundary portion between the wide slit portion 65 and the narrow slit portion 66 in the lead terminal 63, so that a good electrical connection between the lead terminal 63 and the conductor 71 of the electric cord 7 is achieved. Besides, the lead terminal 63 of the light-emitting element 6 has a two-blade configuration as a result of the folding operation, and therefore the two portions of the lead terminal 63 are contacted with the electric cord 7, thus achieving a good electrical connection, and besides the dimension of the lead terminal 63 in the direction of the thickness thereof is increased, so that the light-emitting element 6 is prevented from being tilted in the holder 5, and the direction of the optical axis of the light-emitting element 6 is stable, and the electrical connection of the light-emitting element 6 to the electric cord 7 is enhanced.

The reflector 8 fixedly secured to the base 4 is made of the same material as that of the base 4, and therefore even if the base 4 and the reflector 8 are heated when the light-emitting elements 6 emit light, the base 4 and the reflector 8 are thermally expanded equally, and therefore the reflector 8 will not be displaced relative to the base 4, and the optical axis of the light-emitting element 6 at each reflector portion 82 is prevented from being displaced out of position.

Although this embodiment of the present invention is directed to the tail and stop lamp, the invention can be applied to any other suitable lamp. The present invention can be applied to a lamp having a quadratic-curve surface. In the present invention, in so far as the base, the holders, and the light-emitting elements have their respective functions concerning the present invention, the structures of these parts are not limited to those described in the above embodiment.

As described above, in the present invention, the holders which respectively hold the light-emitting elements are fittingly supported respectively on the plurality of steps formed on the base in a stair-like manner, and the electric cords are held between each of the holders and the associated light-emitting element, and are electrically connected to the light-emitting element. Therefore, the lamp, having a cubic-curve surface, can be easily obtained at a low cost. Each lead of the light-emitting element is folded back in the direction of the thickness, and the distal end portion and the proximal end portion of the lead are fitted in the holder, and are electrically connected to the electric cord. Therefore, the light-emitting element is held in a stable manner, and the direction of the optical axis of the light-emitting element is stable, and the electrical connection of the light-emitting element to the electric cord is stable, and therefore there can be obtained the lamp of high quality. Besides, the reflector provided between the base and the lens is made of the same material as that of the base, and therefore the direction of the optical axis of the lamp is kept stable even when heat is generated by the light emitted from the light-emitting elements.

While only a certain embodiment of the invention has been specifically described herein, it will be apparent that numerous modifications may be made thereto without departing from the spirit and scope of the invention.

The present invention is based on Japanese Patent Application No. Hei. 11-45397 which is incorporated herein by reference.

What is claimed is:

1. A vehicle lamp comprising:
    a lamp body defining a lamp chamber in cooperation with a lens mounted to a front opening of said lamp body;
    a light source unit in the lamp chamber, said light source unit including a plurality of light-emitting elements, a base supporting the light-emitting elements, and at least one electric cord,
    wherein holders for the light-emitting elements of said light source unit are fit to the base of said light source unit, and the light-emitting elements are electrically connected to the electric cord by holding the electric cord between one of the holders and one of the light-emitting elements; the light-emitting element of said light source unit includes at least one lead terminal folded back at an intermediate portion thereof; a folded end portion of the lead terminal is fit in the holder and is in direct contact with the electric cord of said light source unit; the lead terminal of the light-emitting element includes a wide slit portion and a narrow slit portion at the folded end portion; and ends of the wide slit portion, which leads to the narrow slit portions, have a substantial right-angled edge shape.

2. The vehicle lamp according to claim 1, wherein the base of said light source unit includes a plurality of steps arranged in a stair-like manner.

3. The vehicle lamp according to claim 1 further comprising a reflector disposed between the base of said light source unit and the lens mounted to the front opening of said lamp body, reflecting lights emitted by the light-emitting elements of said light source unit, and made of the material same as the base of said light source unit.

4. The vehicle lamp according to claim 2 further comprising a reflector disposed between the base of said light source unit and the lens mounted to the front opening of said lamp body, reflecting lights emitted by the light-emitting elements of said light source unit, and made of the material same as the base of said light source unit.

5. A vehicle lamp comprising:
    a lamp body defining a lamp chamber in cooperation with a lens disposed in a front opening of said lamp body; and
    a light source unit in the lamp chamber, said light source unit comprising:
    a plurality of light-emitting elements, each light-emitting element includes a light-emitting chip and at least one lead terminal attached to and extending from the light-emitting chip;

a holder for holding each light-emitting element separately; and a base for supporting the holder;

wherein an unattached end section of the lead terminal is folded over in parallel to the attached end section of the lead terminal; and the folded end portion of the lead terminal has a slit for engaging an electric cord.

6. The vehicle lamp according to claim 5 wherein the slit has a width slightly larger than the diameter of the electric cord; and the slit leads to a narrower slit that has a width substantially equal to the diameter of a conductor cord inside the electric cord.

7. The vehicle lamp according to claim 5 wherein the folded end potion of the lead terminal, having a width slightly smaller than an opening in the holder, is disposed in the holder through the opening.

8. The vehicle lamp according to claim 5 wherein the holder further includes legs with hooks respectively at the end of the legs; the base has holes for coupling with the legs of the holder.

9. The vehicle lamp according to claim 5 wherein the holder has an opening through which the folded end portion of the lead terminal is inserted; and opposite side walls of the opening of the holder have cooperating slits, each leading to a narrower slit that has a width substantially equal to the diameter of the electric cord.

10. The vehicle lamp according to claim 9 further comprising:

a projection at the bottom of the opening of the holder, for guiding and pushing the electric cord into the narrower slit of the lead terminal when the folded end portion of the lead terminal is inserted in the opening of the holder.

11. A vehicle lamp comprising:

a lamp body defining a lamp chamber in cooperation with a lens disposed in a front opening of said lamp body; and a light source unit in the lamp chamber, said light source unit comprising:

a plurality of light-emitting elements, each light-emitting element includes a light-emitting chip and at least one lead terminal attached to and extending from the light-emitting chip;

a holder for holding each light-emitting element separately; and a base for supporting the holder;

wherein an unattached end section of the lead terminal is folded over in parallel to the attached end section of the lead terminal; the folded end portion of the lead terminal has a slit for engaging an electric cord; the slit has a width slightly larger than the diameter of the electric cord and leads to a narrower slit that has a width substantially equal to the diameter of a conductor cord inside the electric cord; the holder has an opening through which the folded end portion of the lead terminal is inserted; and opposite side walls of the opening of the holder have cooperating slits, each leading to a narrower slit that has a width substantially equal to the diameter of the electric cord.

12. The vehicle lamp according to claim 11 further comprising:

a projection at the bottom of the opening of the holder, for guiding and pushing the electric cord into the narrower slit of the lead terminal when the folded end portion of the lead terminal is inserted in the opening of the holder.

* * * * *

UNITED STATES PATENT AND TRADEMARK OFFICE
CERTIFICATE OF CORRECTION

PATENT NO. : 6,406,173 B1
DATED : June 18, 2002
INVENTOR(S) : Tsutomu Machida and Tomoaki Serizawa It is certified that error appears in the above-identified patent and that said Letters Patent is hereby corrected as shown below:

<u>Title page,</u>
After Item [22], insert:
-- [30]     Foreign Application Priority Data
    February 23, 1999  (JP)     11-045397 --.

Signed and Sealed this

Fourth Day of January, 2005

JON W. DUDAS
*Director of the United States Patent and Trademark Office*